Sept. 18, 1934.   C. PEARSON   1,973,993
TRACTOR MOWER
Filed Jan. 6, 1933   5 Sheets-Sheet 1

Sept. 18, 1934.  C. PEARSON  1,973,993
TRACTOR MOWER
Filed Jan. 6, 1933  5 Sheets-Sheet 2

Fig. 2.

Inventor
Charles Pearson
By
Atty.

Sept. 18, 1934.  C. PEARSON  1,973,993
TRACTOR MOWER
Filed Jan. 6, 1933  5 Sheets-Sheet 3

Inventor
Charles Pearson
By H.P. Darlin
Atty

Sept. 18, 1934.　　　C. PEARSON　　　1,973,993
TRACTOR MOWER
Filed Jan. 6, 1933　　5 Sheets-Sheet 4

Sept. 18, 1934.  C. PEARSON  1,973,993
TRACTOR MOWER
Filed Jan. 6, 1933   5 Sheets-Sheet 5

Inventor
Charles Pearson

Patented Sept. 18, 1934

1,973,993

UNITED STATES PATENT OFFICE 1,973,993

TRACTOR MOWER

Charles Pearson, Waverly, Fla., assignor to International Harvester Company, a corporation of New Jersey Application January 6, 1933, Serial No. 650,403

22 Claims. (Cl. 56—25)

The invention relates to improvements in a mower attachment for tractors, the mower being of the type which is disposed at the rear of the tractor and has its cutter bar disposed transversely in offset relation to the tractor.

More particularly, the improvements relate to features that will adapt such a mower for use with track laying tractors and have its operative parts, such as the pitman and knife driven from the rearwardly extending power take-off shaft of such a tractor.

The main object of the invention is to provide such a mower which can be effectively utilized as a mower attachment for a track type of tractor.

Another object is to provide an improved form of release type cutter bar, so that, when the cutter bar encounters an obstruction with predetermined force, the entire mower attachment may swing rearwardly in a horizontal plane, about a pivot, to prevent damage to the mower.

A further object is to provide an improved form of lift mechanism for adjusting a cutter bar to lift position during operation, and for letting the bar down again to its ground position, said lift mechanism employing the same means to pull the mower attachment back to its normal transverse cutting position when the same has been swung back after release.

Still another object is to provide an improved and automatic way of coupling the mower drive shaft with the power take-off shaft by a self-aligning connection that will permit such coupling of the parts after the cutter bar and mower has swung back to release position, even when the power take-off shaft is in operation.

Many other objects will become apparent to those skilled in this art as the disclosure is more fully made.

The accompanying sheets of drawings show a practicable example of the invention for purposes of the disclosure. In this form, the tractor at its rear end carries a bracket or support and a power take-off shaft, the mower attachment comprising a swingable frame hinged to the aforementioned bracket. This frame includes a coupling arm, carrying a shoe, in turn connected to the cutter bar, the coupling arm and cutter bar extending normally transversely across the rear end of the tractor, there being a longitudinal pull rod connected to the shoe at its rear end, and at its front end having an overload release connection to the tractor side frame. The mower frame carries a driven shaft and gearing to drive a pitman and knife, said shaft being coupled to the tractor power take-off shaft in an improved manner. When the cutter bar and frame have been released, they swing back horizontally about the hinge mentioned to save the attachment from damage. An improved means to return the attachment to normal transverse position is provided, said means in a novel way also being usable to adjust the cutter bar to lift position, all as will later more fully be made known.

In these drawings,

Figure 5 is a rear elevational view of the tractor and mower, the latter showing the cutter bar in cutting position;

The tractor shown comprises a body 10, the rear end only of which has been shown, as that is sufficient for the purposes of this disclosure. Carried on the rear end of this body is an operator's seat 11. The body, which also encloses the driving and steering control gears of the tractor, carries at each side a bracket 12 for supporting the body at its rear end on the side truck frames 13, there being one of these truck frames on each side of the tractor, as understood in this art. These trucks include roller truck wheels for transmitting the weight of the tractor to the ground run of the endless tracks 14, said tracks being trained around and driven by driving sprocket wheels 15 carried at each side of the body in the usual way. Usual fenders 16 are located over each top run of these tracks, said fenders being carried on the body, at its sides, in the usual way, with their rear ends located at the sides of and adjacent the seat 11. The rear wall of the tractor body presents a vertical, flat face closed by a removable cover plate 17 having smaller hand hole cover plates 18, to make interior parts accessible for inspection and repair, without removal of the entire main cover plate 17. See Figures 6 and 7.

Figures 7, 9:
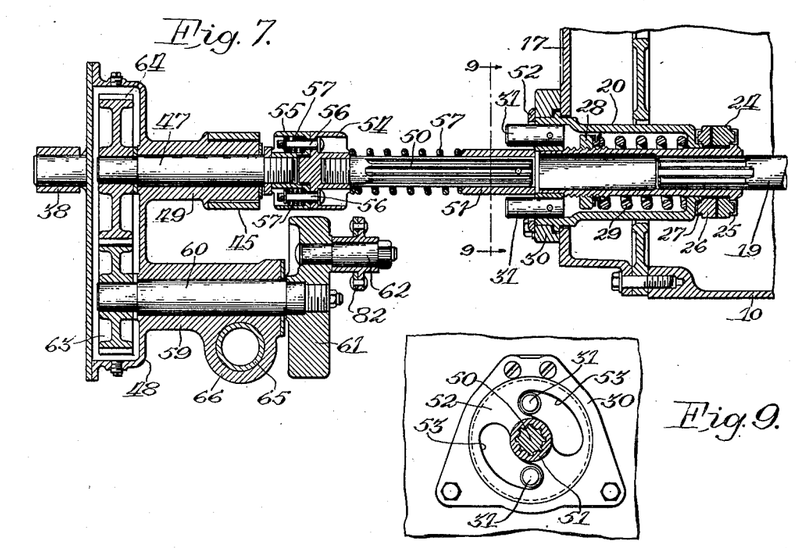
Figure 7 is a detail side sectional view through the driving mechanism, as seen along the line 7—7 of Figure 2, when looking in the direction of the arrows.
Figure 9 is a detail sectional view through the power take-off drive coupling, as seen along the line 9—9 appearing in Figure 7, when looking in the indicated direction; and, Figure 10 is a detail view, partly in section, transversely through the mower yoke, looking from the rear and showing the drive connections from the pitman to the knife.

As shown in Figure 7, the tractor has a power take-off shaft 19 projecting centrally and rearwardly in a longitudinal direction from the body 10. As shown, the rear wall structure of the body carries a rotatable sleeve 20 and an inner tubular shaft 23 splined to the power take-off shaft 19 to be turned thereby. The front end of the shaft 23 carries a two-part slip clutch embodying a part 24 having a tongue and groove connection with a collar 25 on the forward end of the shaft 23. The other part of this slip clutch is shown at 26, having a similar tongue and groove connection 27 with the front end of the sleeve or cage 20. Further, a stop 28 is threaded onto the shaft 23 to hold a spring 29 under compression inside the cage 20 and around the shaft 23, said spring at its front end abutting the front end of the sleeve or cage 20. This stop 28 can be adjustably set along the threads on the shaft 23 to adjust the compression of the spring 29 in an obvious manner. The function of the spring 29 is yieldingly to press the shaft 23, through the stop 28, to the left, as viewed in Figure 7, to press the collar 25 to the left to cause engagement drivingly, of the slip-clutch 24, 26 with the front end of the sleeve or cage 20, thus causing rotation of the sleeve 20. The rear wall 17 of the tractor body 10 carries bolted thereto, a collar 30 in which the rear end of the sleeve 20 rotatably fits, said sleeve 20 carrying a pair of diametrically opposed, rearwardly and longitudinally extending torque transmitting pins 31, which turn with the sleeve 20. The power for driving the parts of the attached mower presently to be described is taken off these pins 31, as will later appear. In the event of an overload that might cause damage to the power take-off arrangement, or to the mower parts, the spring 29 yields to permit slip motion in the slip clutch 24, 26 with respect to the sleeve 20 in a well known manner, temporarily to disconnect driving torque from the shaft 19 to the sleeve 20.

The rear wall 17 of the tractor body 10 carries a transverse support 32, which may in practice be the usual drawbar with which such tractors are provided. See Figure 5. Adjacent this left hand end, as viewed from the rear, the support 32 carries a bracket 33 which mounts a vertical hinge pin 34, said pin turnably carrying a bracket 35. The bracket 35 has secured to it a normally rearwardly extending plate 36, said plate at its rear end having bolted to it a transverse cross-arm 37 terminating at its grassward end in a journal 38. The under edge of the plate 36 has bolted to it another transverse plate 39, the arm 37 and plate 39 additionally being securely bolted together in the manner shown. The plate 39 extends somewhat stubblewardly of the rear end of the longitudinal plate 36 to provide a place for connection of a brace 40, said brace being inclined upwardly and forwardly, so that its upper front end may be hingedly connected to a pin 41 carried in a bracket 42 secured to the upper portion of the rear wall 17 of the tractor. It is to be noted that the pivot 41 is above and in substantial vertical alignment with the hinge pin 34 heretofore described.

Bolted to the brace 40, by bolts 43, is a transverse cast arm 44, arranged substantially parallel with and forwardly of the arm 37, said arm 44 terminating in a journal sleeve 45 in longitudinal alignment with the aforementioned journal 38. The two arms 37 and 44 are appropriately strengthened by a longitudinally disposed connecting brace bar 46.

Figures 5, 10:
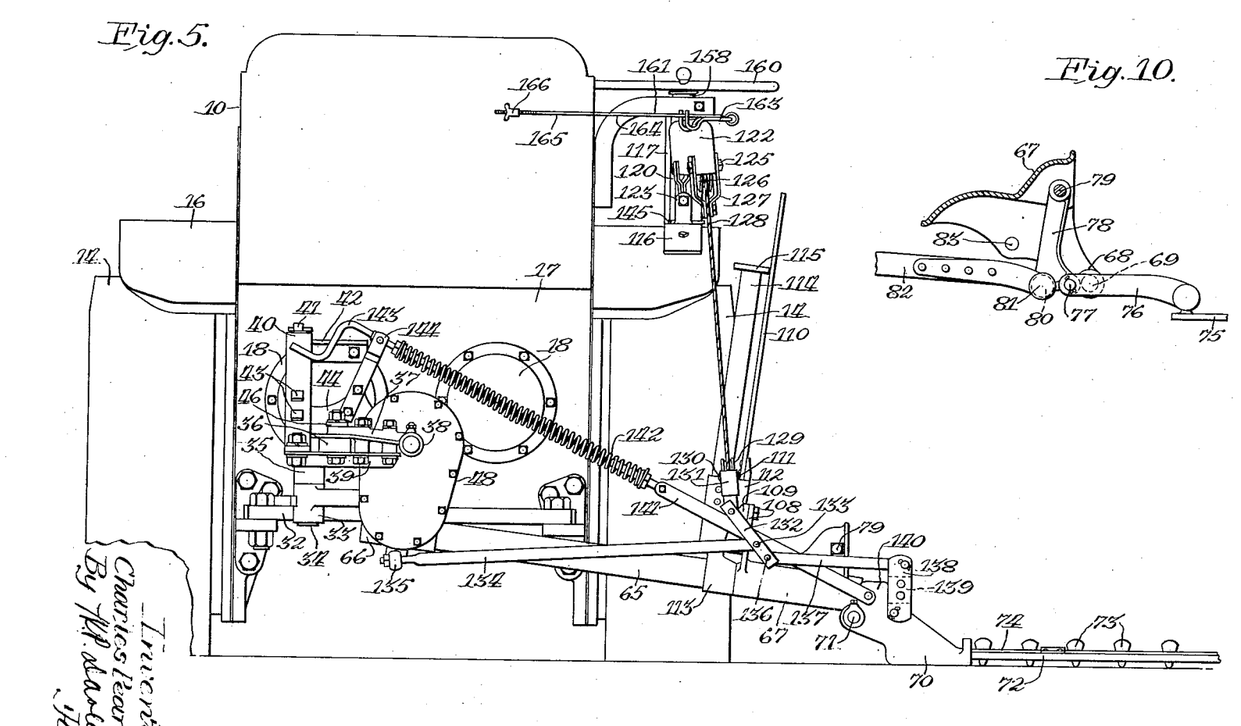

As appears best in Figures 5 and 7, the journal bearings 38, 45 support and rotatably carry a longitudinally disposed driven shaft 47 in normal, coaxial alignment with the shafts 19 and 23. A gear casing 48 is provided with an integrally cast sleeve extension 49 that is turnably carried on the shaft 47 between the two journals 38, 45 for the purpose of pendulously hanging the case 48 from the shaft 47 to allow said case 48 to have angular movement about the axis of the shaft 47. As shown in Figure 7, the extension 49 at its front end fits inside the journal 45.

For the purpose of driving the shaft 47 from the power take-off shaft 19 through the sleeve 20 and its drive pins 31, an intermediate shaft 50 is arranged as a coupler between the sleeve 20 and shaft 47. This intermediate coupler shaft 50 is splined to slidingly carry a sleeve 51 including a vertical plate 52, said plate having two diametrically disposed, arcuately shaped slots 53 cut therethrough (Figure 9). These slots respectively receive the two driving pins 31 heretofore described. To make for easier engagement of the pins 31 in the slots 53, these slots are made wider at their engaging ends, and narrower at the end where the drive pins seat. Adjacent ends of the intermediate shaft 50 and the shaft 47 securely carry complementary, flexibly connected coupling elements 54, 55, these two elements loosely telescoping each other, as shown in Figure 7, and being yieldingly and loosely connected together by bolts 56. This flexible coupling allows the shaft 50 to have angular movement with respect to the shaft 47 to serve an aligning function, so that the plate 52 with its slots 53 will properly engage the drive pins 31, as will later appear. A spring 57 encircles the shaft 50, under compression between the element 54 and sleeve 51, to keep the latter urged along slidingly and yieldingly in the direction of the pins 31. This is possible because a pin 58, which holds the sleeve 51 on the shaft 50, is carried in a slot, as shown in Figure 7, the end of the slot serving to limit the sleeve 51 in such movement, when the pin 58 engages it, as will be readily understood.

As shown best in Figure 7, the front wall of the case 48, near its bottom end, is integrally formed with a forwardly extending sleeve 59, arranged below and parallel with the sleeve extension 49, already described. A counter-shaft 60 is rotatably carried in said sleeve 59 and has its front end projected out of the sleeve 59, where it fixedly carries a flywheel 61 including an eccentrically disposed wrist pin 62. The shaft 60 projects into the case 48 and carries a spur pinion 63 driven directly by a spur gear 64 in the same case 48, and fixed on the shaft 47.

The framework of the mower attachment comprises a normally transversely and grasswardly extending coupling arm 65 (see Figures 5 and 7) carried in a hollow boss 66 formed on the sleeve 59, said coupling arm 65 rockably carrying at its free end, a coupling yoke 67 (see also Figure 1) which includes at its front a depending arm 68 carrying a normally longitudinal hinge pin 69 for hingedly carrying a shoe 70. At the rear of the yoke 67 is carried a second hinge pin 71 in longitudinal alignment with the pin 69 to serve as a rear hinge point for the shoe 70 to the yoke 67. A cutter bar 72 is carried by the shoe 70 in the usual way, said cutter bar provided with a series of finger guards 73 between which reciprocatingly operates a sickle or knife 74. This knife is reciprocated from a knife head 75 (see Figure 10) operated by a short pitman or link 76 pivotally connected at 77 to the lower end of a pendantly hung lever 78. Said lever 78 is hung from a point 79 carried by the upper portion of the yoke 67. The pivots 69, 71 and 77 are substantially coincident along a longitudinal axis when the cutter bar is adjusted vertically, the lower end of the lever 78 swinging between the two pivots 69, 71, as shown best in Figure 1 when the knife is reciprocated. The stubbleward edge of the lever 78 near its bottom end is formed with a ball 80, to which the clamp end 81 of a pitman 82 is connected, the other end of the pitman being connected to the wrist pin 62 on the flywheel 61 heretofore described.

Figures 1, 3, 4:
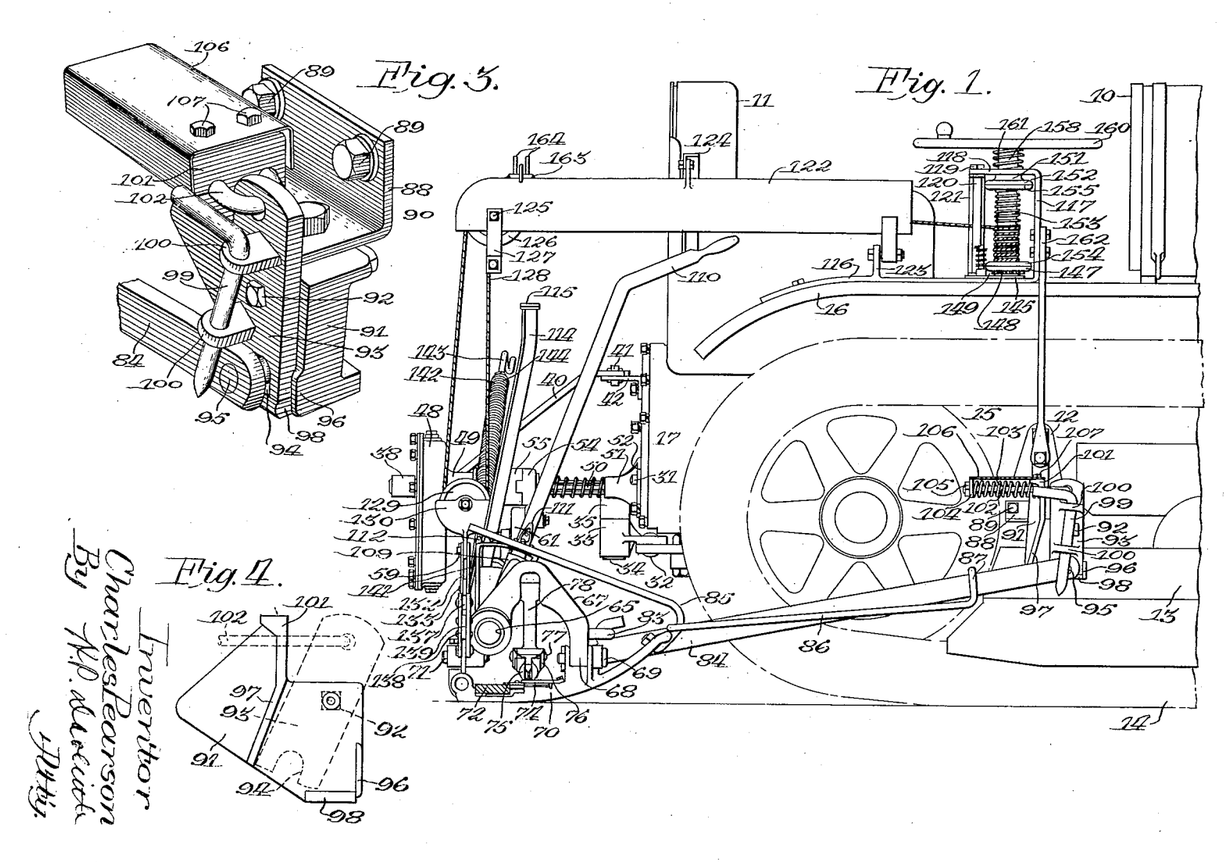
Figure 1 is a side elevational view, showing the rear half of a track laying tractor and the improved mower attached thereto, as seen from the grassward side.
Figure 3 is a perspective detail view of the overload release mechanism.
Figure 4 is a side elevational view of a detail of the overload release.
Figure 2:
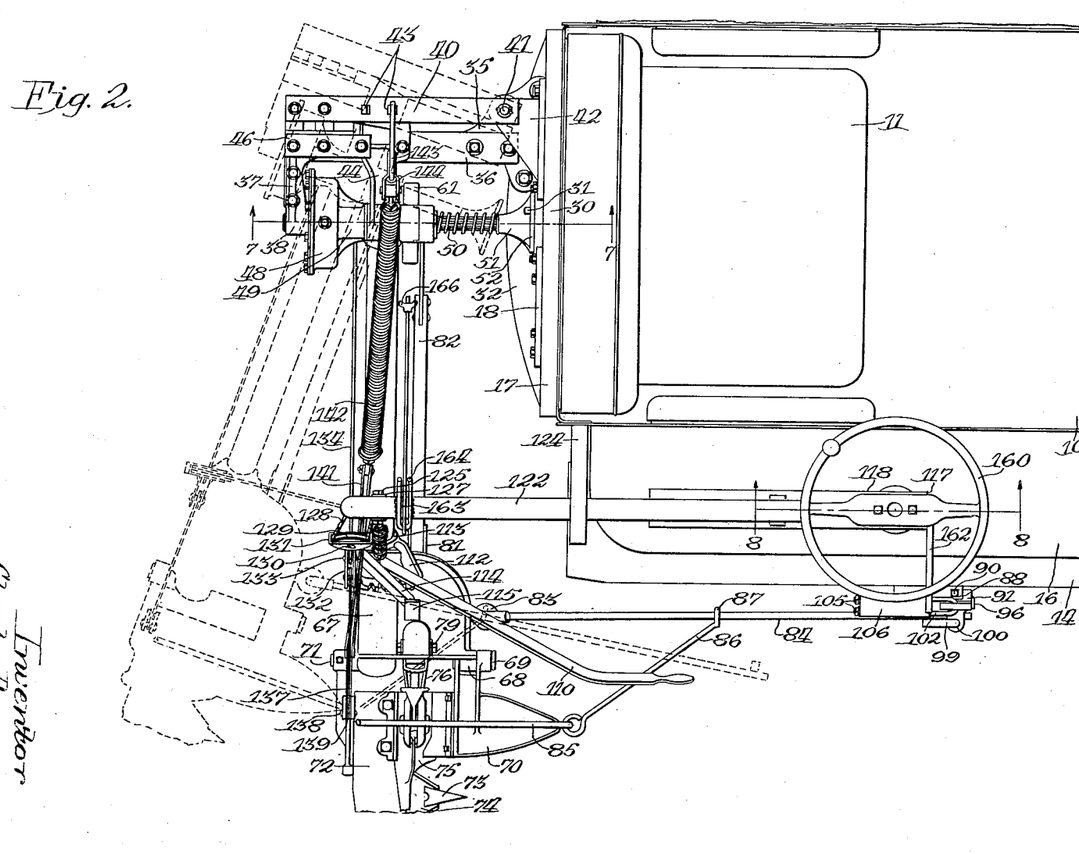
Figure 2 is a plan view thereof, showing in the dotted lines the mower in the act of beginning its swing back after release.

Means has been provided to hold the mower framework and cutter bar in its normal transverse cutting position because without such means, under the force of draft, the structure would hinge backwardly through a horizontal plane about the pivots 34, 41 heretofore described. Such means will now be described. Accordingly, as shown in Figures 1 and 2, the front end of the yoke 67 carries an eye 83 into which is pivotally hooked a pull, or release rod 84 that normally extends forwardly in a longitudinal direction grasswardly of the grassward side truck 13 of the tractor. The front end of the shoe 70 is provided with a guard or lifter 85 that extends upwardly and back over the shoe. The front end of said guard 85 has pivotally connected to it a link 86 which extends diagonally ahead toward the rod 84 and has its front end formed into a hook 87, which is slidingly connected to the rod 84. An overload release connection for the front end of the arm or rod 84 to the side of the tractor is provided, as follows:

As appears best in Figures 1 and 3, an angle iron 88 is secured by bolts 89 to the side of the bracket 12 on the grassward side of the tractor. Bolts 90, one of which is shown, secures a block 91 below the horizontal flange of the angle iron bar 88. As shown in Figures 3 and 4, said block 91 on its outer face has a pivot bolt 92, to which is pivotally connected a latch lever 93 having a notch 94 in its lower end designed releasably to receive a lateral pin 95 carried at the front end of the bar 84. This lever 93 has pivotal swinging movement between a front limit stop boss 96 formed on the block 91 and a rear limit stop boss 97, also formed on the block 91. Further, the lower end of the lever rides across a grasswardly extending ledge 98 also formed on the block 91, so that when the pin 95 is in the notch 94, as shown in Figure 3, the bar 84 cannot fall out of the notch and disconnect from the lever 93, in a downward direction. To prevent lateral disconnection of the bar 84 and its pin 95 from the notch 94 in this position, a pin 99 is detachably carried in a pair of apertured ears 100 formed on the latch lever 93, the pin 99 passing on the outer side of the bar 84 to hold it in place against accidental lateral disconnection. A transverse wall 101 extends upwardly from the block 91, the same being apertured slidingly to receive the legs of a U-bolt 102. Springs 103 encircle these legs and are under tension between the wall 101 and a follower 104 backed by nuts 105 on the rear face of the follower, as shown in Figure 1. A case or shield 106 covers the spring structure, said case being secured by bolts 107 to the wall 101. The bight of the U-bolt 102 is passed pivotally through a hole formed in the upper end of the latch lever 93. It can now be seen that these springs exert a counter force on the upper end of the lever 93 to releasably retain the lower end of said lever 93 pressed forwardly against the stop 96 to prevent normal disengagement of the pin 95 and bar 84 from the latch lever notch 94. Obviously, the force of these springs 103 can be predetermined by the nuts 105 which are utilized in adjusting the springs in a manner quite obvious.

As is well understood in this art, it is necessary in use of the mower to tilt the cutter bar, this being accomplished by rocking the yoke 67 on the coupling arm 65. Accordingly the yoke 67 has integrally formed with it an upstanding ear 108 (see Figures 1, 2 and 5) to which is fixed a channel-shaped block 109 that has connected to it an upwardly and forwardly extending hand lever 110, said hand lever being in proximity to the operator on his tractor seat 11. The lever carries any conventional form of automatic detent or pawl lock 111 cooperating with a toothed quadrant 112 fixed to a casting 113 secured to the coupling arm 65 to hold the lever 110 and cutter bar in set positions of adjustment or tilt, as it is called. This fixed casting 113 also has connected to it an upstanding gag arm 114 provided at its top with a flat stop surface or part 115 for a purpose later to appear.

The cutter bar in addition to being tiltable must also be adjustable to an intermediate lift position to clear small obstructions, and to a high lift position to clear impassable obstructions, and for transportation to narrow the equipment for travel clearance through narrow places. A novel mechanism has been provided for these purposes, and it will next be described.

Figure 8:
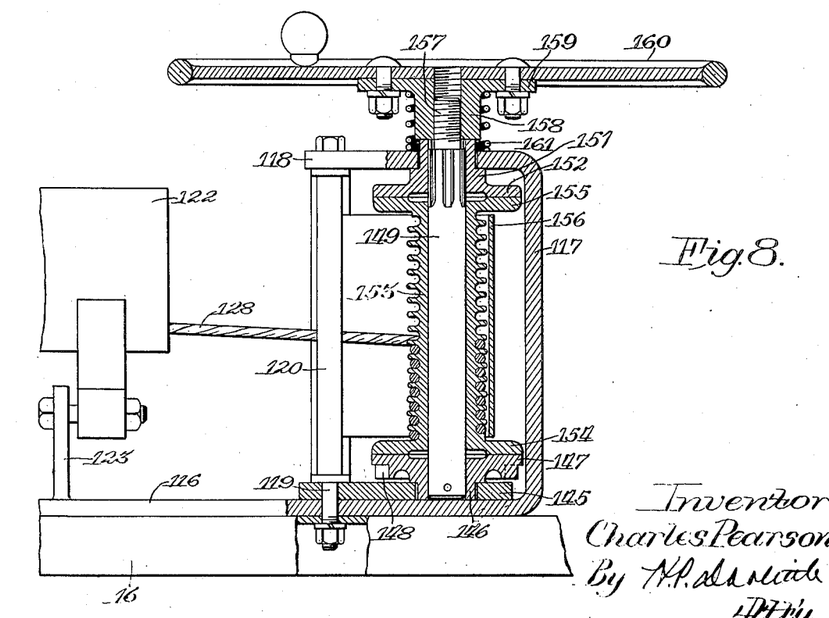
Figure 8 is a detail side sectional view through the lift control mechanism, as seen along the line 8—8 of Figure 2, when looking in the direction of the arrows.

This mechanism, as shown best in Figures 1, 2 and 8, is carried on the grassward fender 16 of the tractor. A strap iron 116 is laid longitudinally on this fender and secured thereto, said iron being bent upwardly at 117 and back again to form a support 118 at its top parallel with the base run of the iron 116. A vertical bolt 119 connects across the open U thus formed, as a brace, said bolt carrying a loose pipe 120 to serve as a roller guide for a purpose soon to appear. A vertical guide strip 121 is also provided spaced slightly from the vertical roller 120. In longitudinal alignment with the guide space thus formed, and rearwardly thereof, an elongated, inverted channel housing 122 is arranged, the same being carried on a bracket 123 on the strap 116, and additionally supported from a hanger 124 carried by the side of the tractor seat 11. A pin 125 is mounted in the rear end of this housing and carries a sheave 126, the ends of the pin outside of the housing 122 hingedly carrying a pendant fork 127, to which is dead-ended a flexible element such as the cable 128. This cable is trained around a pulley or sheave 129 turning on a pin 130 carried in a block 131, which is pivotally connected to the upper end of a double link 132 (see Figure 5). Said link 132 is fulcrumed on a pivot pin 133 carried in the grassward end of a bar 134 connected at 135 to the extension 59 of the rockable case 48. Below the pivot 133, the link 132 is pivotally connected at 136 to a pull link 137 which in turn has its grassward end pivotally connected to a vertically disposed double lever 138 pivotally mounted on the shoe 70. Between the two straps of the lever 138 is a spacer block 139, which in operation of the linkage described is designed at times to abut or stop against a shoulder 140 formed on the shoe 70. Connected pivotally to this same shoulder 140 is an upwardly and stubblewardly extending link 141, to which is connected a counter-balancing spring 142, in turn connected to a threaded crank rod 143 which is carried on a bracket 144 mounted on the member 44. By means of the crank 143, the tension of the spring 142 may be adjustably set.

The cable 128 after being trained around the sheave 129 is passed over the sheave 126 and then run forwardly through the channel housing 122 and through the guide space between the roller 120 and strap 121. A special capstan structure is used to wind the cable, which structure will now be described.

A bearing plate 145 (see Figure 8) is fixed on the strap 116 between the rod bolt 119 and the upstanding part 117, which is formed with an opening loosely and turnably to receive the vertically disposed hub 146 of a ratchet and clutch plate 147. The top, horizontal surface of this plate is finished flat to form a friction clutch face, while the under side of said plate is provided with ratchet teeth 148 around its periphery. As shown in Figure 1, a spring pressed pawl or dog 149 cooperates with the ratchet teeth to prevent back lash of the plate 147, by which is meant that the plate is held against turning movement in the wrong direction. Pinned or otherwise securely fastened in the hub 146 of the plate 147 is a vertical shaft 149 (see Figure 8) having a splined surface 150 adjacent its upper end, to slidably receive a hub 151 of another clutch plate 152, said hub 151 being turnably, as well as slidably, mounted in a hole in the top plate 118, the hub extending a distance upwardly above said plate 118. Carried turnably on the shaft 149 between the clutch plates 147, 152 is a vertical capstan or reel 153 having its periphery grooved to receive the coils of the cable which is wound therearound, the cable having its end dead-ended to the bottom groove of the capstan in any desired manner. The lower end of the windlass spool 153 is formed with a clutch plate 154 to frictionally engage the plate 147; and the upper end of said spool 153 is formed with a similar clutch plate 155 to frictionally engage the clutch plate 152. A shield 156 is mounted on the strap 121, the same extending forwardly alongside the tractor side of the capstan 153 and then being bent rather closely around its front side to insure proper laying of the coils of the cable in the capstan grooves. The top end of the shaft 149 is machined down and threaded at 157 to receive turnably and threadedly a sleeve 158 having arms 159 to which is bolted the spoke of a hand operating wheel 160. The lower end of the sleeve 158 abuts the top end of the hub 151 of the clutch element 152. A compression spring 161 is arranged around the hub 158 between the top side of the strap 118 and the arms 159. A stout brace 162 connects between the part 117 of the capstan structure and the tractor side bracket 12.

The rear end of the channel housing 122 carries at its top edge a bracket 163 including a fork 164. A rod 165 has one end formed with an eye to hingedly connect to said bracket 163, the rod normally being hinged back in a transverse direction rearwardly of the tractor seat, and resting across said housing, as shown in Figure 5. In this position the rod is received by the fork 164. The other end of the rod is threaded to receive a wing nut 166. The purpose of this rod will presently be made known.

The mower of this invention is in the nature of an attachment, as has been said, which can be coupled to a tractor or be removed therefrom to leave the tractor free for other uses. The present mower attachment has been especially shown in connection with and designed for use with a track laying type tractor, although obviously the invention embodies principles for a mower attachment which can just as well be utilized in connection with the usual wheel type of tractor.

In connecting the mower attachment to the tractor, the bracket 33 and pin 34 of the mower attachment are mounted on the tractor drawbar or other appropriate support 32, while the brace 40 is hingedly connected to the pin 41 carried by the bracket 42 mounted on the rear face or wall of the body of the tractor. This can easily be accomplished by appropriately propping up the attachment and backing the tractor up to the parts, so that they can be properly aligned by hand and be connected. In the normal position of the attachment the cutter bar must be transversely disposed rearwardly of the tractor to be in proper cutting position, and such position of the cutter bar is maintained by coupling the pin 95 of the rod or bar 84 into the notch 94 at the lower end of the release latch lever 93, such coupling of the pin 95 with respect to the notch 94 being easily accomplished upon removal of the pin 99. The springs 103 on the U-bolt 102 exert a force on the upper end of the lever 93 to hold the lower end of the lever 93 with its notch 94 forwardly against the stop 96, and in this position of the latch lever 93 the bottom of the notch 94 is closed by the ledge 98, so that the bar 84, and especially its pin 95, cannot accidentally drop downwardly out of the release latch mechanism.

Placing the mower attachment in its normal cutting position automatically serves to couple the intermediate shaft 50 with the pins 31 on the driving sleeve 20 because the pins guide into the slots 53 on the sleeve 52 in a manner that will be readily understood. In the event that pins 31 are not aligned with the slots 53, they would automatically engage into the slots anyway upon rotation of the sleeve 20, and the spring 57 would be active to shift the sleeve 51 with its plate 52 into the driving coupling position shown in Figure 7. The cable 128 must, of course, be coupled up in the manner heretofore described, as shown in Figure 1, and all slack must then be taken up by operating the hand wheel 160. The tractor mower attachment is now ready for operation.

In operation, an operator is seated on the seat 11 of the tractor where the tilt lever 110 and the hand wheel 160 are conveniently accessible for operation. The tractor is started and, as soon as the power take-off shaft 19 thereof is put into gear and operation, the sleeve 20 is driven through the slip clutch elements 24, 25, 26, and 27, the pins 31 of said sleeve 20 then driving the intermediate coupler shaft 50 and main shaft 47, which, through gears 64 and 63, actuate the counter-shaft 60 to drive the flywheel 61, which in turn reciprocates the pitman 82 through the eccentric, or wrist pin, 62. The pitman 82 oscillates the pendant lever 78, which, in turn, is connected by means of the pivoted link or short pitman 76 to the knife head 75, which, in turn, reciprocates the sickle 74 of the mower.

By means of the lever 110, the operator can adjustably set the tilt of the cutter bar, which lever, as heretofore described, rocks the yoke 67 and shoe 70 about the grassward end of the coupling arm or pipe 65.

Figure 6:
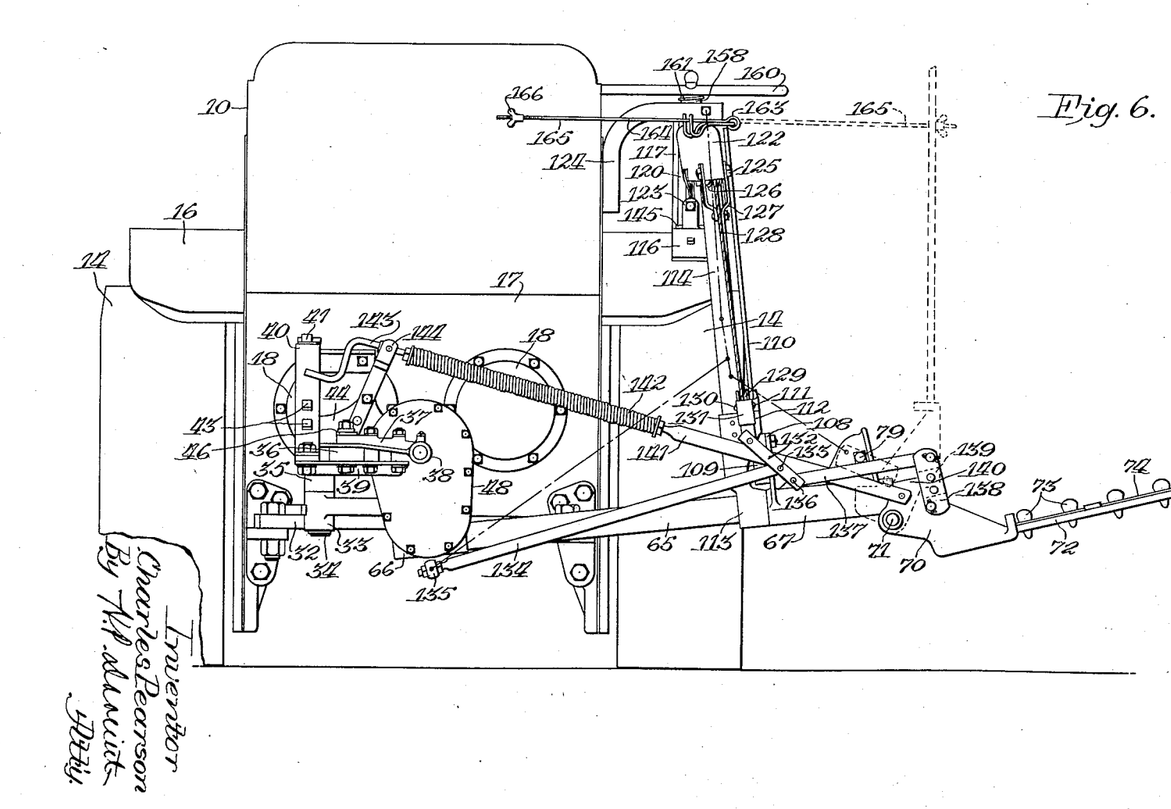
Figure 6 is a view similar to Figure 5, but showing in the full lines the cutter bar in intermediate of plain lift position; in the dotted lines, the absolute vertical lift position of the cutter bar; and, in the dot and dash lines is shown the positions assumed by the pivots and levers when the cutter bar has been raised to this vertical position.

If it is desired to adjust the cutter bar from the normal cutting position of Figure 5 to the plain lift position shown in full lines in Figure 6 to permit the cutter bar to pass a slight obstruction, then the operator actuates the hand wheel 160 by turning the same and, as shown in Figure 8, such turning movement causes the wheel in one direction of rotation to move down on the threads 157 of the shaft 149 until the lower end of the sleeve 158 engages and presses down on the sleeve 151. This causes the sleeve 151 to slide down on the spline 150 to engage the clutch plates 152 and 155. At the same time the clutch plates 154 and 147 are engaged frictionally at the lower end of the capstan 153. Thus, all of the parts are frictionally locked together, so that continued turning movement of the hand wheel 160 turns the capstan spool 153 to wind up the cable 128, which is guided between the roller 120 and strap 121 and caused to be coiled around the capstan 153 by the shield 156, which insures the proper laying of the coils of cable as the capstan turns. A back lash of the capstan, or reverse turning movement, is prevented by the dog 149 engaging in the ratchet teeth 148. This is quite an important feature, as the weight of the cutter bar as it leaves the ground creates quite a load on the cable. The cable, as it tightens and pulls, actuates the linkage 132, 137, 138 to raise the shoe 70 with the cutter bar about the pivots 69 and 71, the cutter bar reaching its plain lift position when the block 139 in the lever 138 abuts the shoulder 140 on the shoe 70.

Should it be desired to raise the cutter bar still higher to absolute or vertical lift position, then the capstan operating wheel 160 is rotated still further to wind up more of the cable. When the cutter bar reaches the full line position of Figure 6, the gag bar 114 has lifted to a point where the top 115 thereof will contact and stop against the lower edge of the channel housing 122. This gags or stops further up-movement of the coupling arm 65, so that continued pull of the cable 128 serves to make all of the pulling effort operative on the shoe 70 itself, so that the shoe must be completely pivoted upwardly to the dotted line position shown in Figure 6. In this Figure 6, the positions of the fulcrum rod 134, link 132, and link 137 are shown in the dot and dash lines, with the extreme position of the pivot centers also indicated.

The counter-balancing spring 142, of course, is operative to help lift the weight of the cutter bar in the usual manner.

During this raising movement of the cutter bar, it is to be noted that the coupling arm 65 rocks the casing 48 about the axis of the shaft 47, which is in line with the power take-off shaft 19. This rocking movement of the casing 48 from left to right is indicated in Figures 5 and 6.

The use of a flexible element, such as the cable 128, is an important feature when the tractor mower is used as an attachment for a track laying type of tractor. These tractors and especially their side trucks rise and fall in vertical planes about pivots in traveling over uneven ground, causing a lot of movement of the tractor relative to the mower attachment, and at times the cutter bar might be traveling on a down slope or on an up slope involving such a wide range of movement that a cable lift mechanism is far more satisfactory than a mere linkage mechanism because the cable is not limited to length as a system of levers and links would be. The cable, being stored on a capstan screw, can be let out to take care of maximum or extreme positions of the cutter bar with respect to the tractor. Further, as shown in Figure 10, these extreme positions which the cutter bar may and must some times assume are borne in mind by the provision of a novel drive from the pitman to the knife. In other words, the lever 78 and link 76 pivoted thereto at 77 permit operation of the sickle through a wide angular range of up and down movements which the cutter bar may assume.

The clutch arrangement embodied in the capstan is also interesting in that it can be used as a brake to let the cutter bar down easily, whereas in a link and lever adjusting system, the cutter bar is usually dropped forcibly on the ground when it is released. By this capstan arrangement the operator can let down the bar as easily and lightly as he pleases by utilizing the frictional resistance between the clutch plates 147, 154 and 152, 155. In letting down the cutter bar again, the back lash preventing dog 149 does not interfere with this operation because what is done is merely to release the spool 153 so that it can turn on the shaft 149, and the part 147, in fact, does continue to be locked by the dog 149.

Due to the high traveling speed of the tractor, great injury would result to the cutter bar, should it encounter an unforseen obstruction and, therefore, the release mechanism of Figures 3 and 4 has been provided to permit the coupling rod or bar 84 to be released from latch lever 93 when an obstruction is encountered by the cutter bar with sufficient force to overcome the predetermined resistance of the springs 103. When such obstruction is encountered, the force against the cutter bar is transmitted into a pull on the rod or bar 84, causing a pull toward the rear on the lower end of the latch release lever 93. The lower end of the lever then moves back against the pull of the springs 103 until the notch 94 clears the ledge 98, causing the pin 95 to drop out of the notch to free and completely disconnect the bar 84 from the overload release coupling. Nothing remains now to hold the cutter bar in its transverse position and under the continued forward travel of the tractor, the cutter bar and entire mower framework, including the coupling arm 65 and framework arms 39, 37 and 36, are permitted to swing back rearwardly through a horizontal plane about the hinge pin 34 and also about the hinge pin 41. In Figure 2, the dotted lines show the beginning of this rearward swinging movement of the bar. However, it is to be understood that the bar can, in fact, swing back through substantially an arc of 90 degrees, so that the mower in its maximum position is located completely to the rear of the tractor with the cutter bar being dragged endwise longitudinally of the line of draft. Upon the initiation of this rearward movement shown in the dotted line position of Figure 2, the plate 52 disengages from the driving pins 31, so that the transmission of power to the gearing and knife of the mower attachment is almost instantly stopped. The rod 86 serves to hold the member 84 in a lateral position clear of the adjacent tractor track, so that it will not be injured by the track.

In restoring the mower cutter bar and framework as a unit to its normal cutting position with respect to the tractor after it has been released and when the obstruction has been passed, the operator merely actuates the hand wheel 160 to wind up the cable, which, of course, has been let out automatically during the release operation. It is to be understood, of course, that the hand wheel is not clamped down tight to clutch the capstan reel normally, and the spring 161, in fact, serves to hold the wheel hub 158 disengaged from the clutch hub 151. Thus, when the cutter bar is released, the reel 153 would, in fact, be free to turn to permit the cable to unwind. Accordingly, in operating the wheel 160, the windlass reel 153 would begin winding up the cable 128 and eventually as it tightens, the pull transmitted to the sheave 129 would restore the cutter bar and mower framework to the normal transverse cutting position. As the mower attachment swings back forwardly through its horizontal arc, the coupling plate 52 would automatically reengage pins 31 to permit restoration of the driving action, so that the operator need pay no attention whatsoever to the recoupling of the transmission. After having thus restored the cutter bar to its normal transverse cutting position, the operator must temporarily leave his seat 11 on the tractor to recouple the pin 94 in the latch release lever 93. The mower attachment is now ready for use again.

When transporting the mower from field to field and through narrow places, the cutter bar is raised to the dotted line position shown in Figure 6 and then held there against vibration during transport by the rod 165, the threaded end of which is slipped through a hole in the cutter bar, the bar then being held in place by the wing nut 166 in the manner shown in Figure 6.

From this detailed description it will now be plain that an improved mower has been provided for tractors and especially for a tractor of the track laying type, which described construction achieves all of the desirable objects heretofore recited for the invention.

It is the intention to cover all such changes and modifications of the illustrative practicable example of the invention herein shown which do not depart from the spirit and scope of the invention as indicated by the definitions thereof constituted in the appended claims.

What is claimed is:

1. A mower attachment for a tractor having a support at its rear, said mower attachment connected hingedly to the support for rearward swinging movement horizontally, means embodying a releasable connection for retaining the attachment in a normal transverse cutting position, and manually operable means for restoring the mower attachment to its normal transverse cutting position after it has swung back.

2. A mower attachment for a tractor having a support at its rear, said mower attachment connected hingedly to the support for rearward swinging movement horizontally, means embodying a releasable connection for retaining the attachment in a normal transverse cutting position, and operator controlled means on the tractor having connection with the attachment to restore the same to its normal transverse cutting position after it has swung back.

3. A mower attachment for a tractor having a support at its rear, said mower attachment connected hingedly to the support for rearward swinging movement horizontally, means embodying a releasable connection for retaining the attachment in a normal transverse cutting position, and means on the tractor comprising a capstan and flexible element connected to the attachment, said means including means to operate the capstan to wind the flexible element to cause restoration of the mower attachment to its normal transverse cutting position after it has swung back.

4. A mower attachment for a tractor having a support and a power take-off at its rear, said mower attachment connected hingedly to the support for rearward swinging movement horizontally, means embodying a releasable connection for retaining the attachment in a normal transverse cutting position, a driven shaft on the mower attachment, a coupler separably connecting the shaft to the power take-off in the normal cutting position of the mower, said coupler disconnecting from the power take-off when the mower is released and swings back, and means for automatically aligning and reconnecting the coupler to the take-off when the mower is restored to normal transverse cutting position.

5. A mower attachment for a tractor having a support and a power take-off at its rear, said mower attachment connected hingedly to the support for rearward swinging movement horizontally, means embodying a releasable connection for retaining the attachment in a normal transverse cutting position, a driven shaft on the mower attachment, a coupler separably connecting the shaft to the power take-off in the normal cutting position of the mower, said coupler disconnecting from the power take-off when the mower is released and swings back, means on the tractor to restore the mower attachment to its normal transverse cutting position, and means for automatically aligning and reconnecting the coupler to the take-off when the mower is restored to said normal transverse cutting position.

6. The combination with a tractor having a rear end support, a mower attachment connected to the support, said mower including an adjustable cutter bar, means carried on the tractor comprising a capstan and cable connected to the cutter bar to adjust the same, and means on the tractor to operate the capstan.

7. A mower attachment for a tractor having a support, a mower connected to the support, said mower including an adjustable cutter bar, means on the tractor comprising a capstan and cable connected to the cutter bar to adjust the same, said capstan normally being free to turn, friction means to engage the capstan for positively turning the same, and manual means to apply said frictional means and to turn the capstan.

8. A mower attachment for a tractor having a support, a mower connected to the support, said mower including an adjustable cutter bar, means on the tractor comprising a capstan and cable connected to the cutter bar to adjust the same, said capstan normally being free to turn, friction means to engage the capstan for positively turning the same, means to apply said frictional means and to turn the capstan, and means to prevent back lash of the capstan.

9. A mower attachment for a tractor having a support, a mower connected to the support, said mower including an adjustable cutter bar, means comprising connected links and levers to adjust said cutter bar, a block and cable system carried by the tractor, said cable connected to the adjusting means, and a manually actuated rotary means carried on the tractor to wind the cable for actuating the adjusting means to adjust the cutter bar.

10. A mower attachment for a track laying type tractor having a fender at its side and a support at its rear, a mower connected to said support, said mower including an adjustable cutter bar, a system of links and levers to adjust the cutter bar, a block and cable system carried by the tractor, said cable connected to the system of links and levers, and a rotary means carried on the tractor fender to wind the cable for actuating the system of links and levers to adjust the cutter bar.

11. A mower attachment for a tractor having a rear support, said mower attachment connected hingedly to the support for rearward swinging movement horizontally, means for releasably holding the mower in normal transverse cutting position, said mower including a vertically adjustable cutter bar, and a common means for adjusting the cutter bar and for restoring the mower to normal cutting position after it has been released and swung back.

12. A mower attachment for a tractor having a rear support, said mower attachment connected hingedly to the support for rearward swinging movement horizontally, means for releasably holding the mower in normal transverse cutting position, said mower including a vertically adjustable cutter bar, a capstan on the tractor, a cable actuated by the capstan and connected to adjust the cutter bar and to restore the mower attachment to normal cutting position after it has been released and swung back, and means to operate the capstan.

13. A mower attachment for a tractor having a power take-off and a support, said mower attachment connected to the support and embodying framework, a shaft carried on said framework, a gear case swingably hung from the shaft, a counter-shaft in the case, gears connecting the shafts, a flywheel on the counter-shaft, a coupling arm carried in a portion of the case, a yoke carried rockably on the arm, a shoe pivoted to the yoke, a cutter bar carrying a knife, said cutter bar connected to the shoe, and means to adjust the cutter bar, said gear case pivoting about the first shaft, and means connecting the flywheel and knife to operate the latter.

14. A mower attachment for a tractor having a power take-off and a support, said mower attachment connected to the support and embodying framework, a shaft carried on said framework, a gear case swingably hung from the shaft, a counter-shaft in the case, gears connecting the shafts, a flywheel on the counter-shaft, a coupling arm carried in a part attached to the case, a yoke carried rockably on the arm, a shoe pivoted to the yoke, a cutter bar carrying a knife, said cutter bar connected to the shoe, means to adjust the cutter bar by raising the yoke and shoe, said case swinging on the axis of the first shaft during such movement of the yoke and shoe, and a pitman driven by the flywheel and connected to reciprocate the knife.

15. A mower having a frame supporting a shaft, a flywheel on the shaft, a coupling arm carrying a yoke, a lever pendantly hung for swinging movement in the yoke, a pitman connected between the flywheel and lever, a shoe hinged to the yoke, a cutter bar carried by the shoe, a knife on the cutter bar, a link pivoted to the lower end of the lever, and means connecting said link to drive the knife.

16. A mower having a frame supporting a shaft, a flywheel on the shaft, a coupling arm carrying a yoke, a lever pendantly hung for swinging movement in the yoke, a pitman connected between the flywheel and lever, a shoe hinged to the yoke, a cutter bar carried by the shoe, a knife on the cutter bar, a short pitman link pivoted to the lever on an axis substantially coincident with the axes of the pivots of the shoe to the yoke, a knife head on the knife, and means connecting the short pitman link to drive the knife head and knife.

17. A mower attachment for a tractor having a support, a mower connected to the support, said mower including an adjustable cutter bar, means comprising connected links and levers to adjust said cutter bar, a block and cable system, an elongated housing supported from the tractor to carry said block and cable system, said cable connected to the adjusting means, a rotary means on the tractor to wind the cable for actuating the adjusting means to adjust the cutter bar to plain lift position, and a gag bar on the attachment to engage said housing to permit said rotary means and cable to adjust the cutter bar to vertical lift position.

18. A mower attachment for a tractor having a support, a mower connected to the support, said mower including an adjustable cutter bar, means comprising connected links and levers to adjust said cutter bar, a block and cable system, an elongated housing supported from the tractor to carry said block and cable system, said cable connected to the adjusting means, a rotary means on the tractor to wind the cable for actuating the adjusting means to adjust the cutter bar to vertical lift position, and means on the housing to engage the cutter bar to retain it in such position positively for transport.

19. A mower attachment for the rear end of a tractor, said attachment comprising a frame hingedly connected to the tractor at one point, said frame carrying a coupling arm and cutter bar, said attachment being releasably connected to the tractor at another point whereby the attachment may swing back horizontally to the rear of the tractor from a normal transverse cutting position, said cutter bar being mounted for vertical adjustments, a capstan on the tractor, and a flexible element operated by the capstan and connected to the attachment to adjust the cutter bar and to return the attachment to normal cutting position after it has been released and swung back.

20. A mower attachment for a tractor, said mower having an adjustable cutter bar, a shaft on the tractor, a bearing for one end of the shaft embodying a clutch face, a bearing slidable on the other end of the shaft and also having a clutch face, a reel turnable on the shaft and having at each end a clutch face complementary to the aforementioned clutch faces on the bearings, a cable wound on the reel and connected to adjust the cutter bar, and means to move the slidable bearing to clamp the reel frictionally between the bearings through said clutch faces to turn the reel.

21. The combination with a track type tractor having side track frames and a rear support, of a mower attachment hingedly connected to the support and releasably associated with one of the side frames for normally retaining the mower in its transverse cutting position, and means carried on the tractor above said side frame for swinging the mower.

22. The combination with a track type tractor having side track frames and a rear support, of a mower attachment hingedly connected to the support and releasably associated with one of the side frames for normally retaining the mower in its transverse cutting position, and means carried on the tractor above said side frame with which the mower is releasably associated, said means comprising a rotary member, a flexible element connected between the rotary member and the mower, and means to turn the rotary member.

CHARLES PEARSON.